(12) United States Patent
Smith et al.

(10) Patent No.: US 8,083,450 B1
(45) Date of Patent: Dec. 27, 2011

(54) REMOVABLE ANCHOR AND FASTENER

(75) Inventors: Michael Walter Smith, Lake Zurich, IL (US); Michael Anthony Giugliano, Elgin, IL (US); Daniel James Dickinson, Arlington Heights, IL (US); Mark Fleydervish, Buffalo Grove, IL (US); Edward Sacha, Chicago, IL (US)

(73) Assignee: Termax Corporation, Lake Zurich, IL (US)

( * ) Notice: Subject to any disclaimer, the term of this patent is extended or adjusted under 35 U.S.C. 154(b) by 0 days.

(21) Appl. No.: 10/706,252

(22) Filed: Nov. 12, 2003

(51) Int. Cl.
*F16B 39/284* (2006.01)

(52) U.S. Cl. ........ 411/112; 411/111; 411/118; 411/173; 411/970

(58) Field of Classification Search .......... 411/111–113, 411/173, 437, 118, 970
See application file for complete search history.

(56) References Cited

U.S. PATENT DOCUMENTS

| | | | | |
|---|---|---|---|---|
| 1,784,821 A | * | 12/1930 | Crowley | 285/34 |
| 2,303,148 A | * | 11/1942 | Tinnerman | 411/111 |
| 2,376,167 A | * | 5/1945 | Mitchell | 411/173 |
| 2,390,752 A | * | 12/1945 | Tinnerman | 411/112 |
| 2,404,236 A | * | 7/1946 | Kost | 411/173 |
| 2,426,799 A | * | 9/1947 | Tinnerman | 411/173 |
| 2,430,555 A | * | 11/1947 | Burke | 411/173 |
| 2,495,037 A | * | 1/1950 | Tinnerman | 411/112 |
| 2,609,723 A | | 9/1952 | Stubbs | |
| 2,633,886 A | * | 4/1953 | Tinnerman | 411/112 |
| 2,644,502 A | * | 7/1953 | Tinnerman | 411/107 |
| 2,649,126 A | * | 8/1953 | Tinnerman | 411/113 |
| 2,682,906 A | * | 7/1954 | Poupitch | 411/112 |
| 2,695,046 A | * | 11/1954 | Tinnerman, III | 411/112 |
| 2,707,013 A | * | 4/1955 | Flora et al. | 411/173 |
| 2,717,622 A | * | 9/1955 | Flora | 411/112 |
| 2,727,552 A | * | 12/1955 | Chvesta | 411/112 |
| 2,916,235 A | | 12/1959 | Nagel | |
| 2,967,556 A | * | 1/1961 | Jaworski | 411/112 |
| 3,035,624 A | * | 5/1962 | Jaworski | 411/112 |

(Continued)

FOREIGN PATENT DOCUMENTS

DE 2244147 3/1973

(Continued)

OTHER PUBLICATIONS

Rapid, Rapid Fasteners Technology (catalog) (c) 1996, 8 pages.

*Primary Examiner* — Victor Batson
*Assistant Examiner* — Tyler Johnson
(74) *Attorney, Agent, or Firm* — CGIP Law

(57) ABSTRACT

An anchor facilitates blind engagement by a first fastener in order to connect an object to a wall. The anchor may be inserted into a cavity accessible through a hole defined in a hollow substrate to connect the object to the wall. The anchor includes a base plate and a pair of laterally offset arms extending from the base plate, such that each arm includes an engagement structure disposed at a distal end of each arm. The engagement structure of each arm cooperatively supports the anchor and complementarily engages the first fastener. The first fastener may be a bolt, a screw, or any suitable fastener such as a threaded fastener. The engagement structure includes a collar extending outwardly from each arm for engaging the hollow substrate upon insertion of the anchor into the cavity. Additionally, the engagement structure includes a tang extending inwardly from each arm, generally defining a portion of a first aperture for engaging the first fastener.

26 Claims, 6 Drawing Sheets

U.S. PATENT DOCUMENTS

| | | | |
|---|---|---|---|
| 3,127,807 A | 4/1964 | Modrey | |
| 3,248,994 A | 5/1966 | Mortensen | |
| 3,288,014 A | 11/1966 | Mortensen | |
| 3,645,311 A * | 2/1972 | Tinnerman | 411/173 |
| 3,707,898 A | 1/1973 | Holly | |
| 3,783,922 A * | 1/1974 | Petrus | 411/111 |
| 4,105,650 A * | 8/1978 | Shanbrom et al. | 530/380 |
| 4,120,231 A | 10/1978 | Neumayer | |
| 4,167,648 A * | 9/1979 | Lockwood | 174/53 |
| 4,250,732 A * | 2/1981 | Moryl | 72/357 |
| 4,410,298 A * | 10/1983 | Kowalski | 411/112 |
| 4,595,325 A * | 6/1986 | Moran et al. | 411/173 |
| 4,610,588 A * | 9/1986 | Van Buren et al. | 411/173 |
| 5,022,804 A * | 6/1991 | Peterson | 411/104 |
| 5,108,240 A | 4/1992 | Liebig | |
| 5,221,169 A | 6/1993 | McSherry et al. | |
| 5,873,690 A * | 2/1999 | Danby et al. | 411/55 |
| 6,644,713 B2 * | 11/2003 | Del Pozo Abejon et al. | 296/39.1 |
| 6,709,182 B1 * | 3/2004 | De Jong | 403/12 |
| 2005/0271492 A1 * | 12/2005 | Jackson et al. | 411/112 |

FOREIGN PATENT DOCUMENTS

DE      2549868      5/1976

* cited by examiner

REMOVABLE ANCHOR AND FASTENER

FIELD OF THE INVENTION

The invention relates generally to anchoring devices for fastening objects, and more particularly to an anchoring device for insertion into a cavity accessible through a hole defined in a hollow substrate, wall, plate, or any suitable planar surface to facilitate blind engagement by a fastener.

BACKGROUND OF THE INVENTION

A number of devices and fasteners are currently available for blind attachment of objects to structures such as hollow substrates. As used herein, the attachment of an object to a hollow substrate also refers to the attachment of the object to a hollow substrate, plate, body panel, structural framework, wall or any suitable object. However, in many industries, as for example in the automobile industry, difficulty is frequently encountered in fastening a plurality of objects together, such as in securing a body panel to the structural framework or chassis because the inside end of the fastening element extends into a cavity that is inaccessible. As a result, it is difficult or impossible to position a nut in such a manner that a screw can be readily engaged therewith. Additionally, it is often difficult to hold the nut from turning while the screw is being tightened. This difficulty in automobile assembly has been partially solved by permanently affixing a nut such as a weld nut to the inner surface of the innermost of the members to be fastened together in position to receive a bolt or screw after the parts have been assembled. This has often proved disadvantageous because of the impossibility of replacing the nut should it become damaged. Another partial solution was to use rivets. However, this technique also has frequently proved disadvantageous because of the difficulty of removing the fastening device without damage to the members joined by the rivets.

Toggle bolt fasteners are known for providing an attachment device on a blind side of a wall. Toggle bolt fasteners are known and serve for mounting relatively light work pieces and those subject to light external loads on hollow walls. The bolt of these toggle bolt fasteners is screwed into a threaded hole on which the toggle, in the form of a piece of stamped sheet metal, is provided, such that it can be turned or tilted from an insertion position to a locking position at a right angle to the screw. These toggle bolt fasteners often include a pair of legs and a guide member with self-spreading arms, or some complex arrangement to which the anchor member is attached. The toggle bolt fastener is inserted into the mounting hole, and the bolt is rotated into the threaded hole to a length such that it can be inserted into the cavity to the depth necessary to allow the locking element to turn. After insertion into the mounting hole, the toggle bolt fastener is then rotated 90 degrees to the locking position by manipulating the screw. The screw is then driven into the hole until the screw comes in contact with an object that is to be mounted on the hollow wall. The toggle legs are tightened against the inside surface of the hollow wall. Toggle bolt fasteners do not, however, provide the degree of blind control for the attachment device, coupled with restraint requirements, whereby all types of fastening can be achieved. Additionally, these devices often utilize complex arrangements for blind attachment, and such arrangements necessarily compromise the strength of the fastener system.

Some toggle bolt fasteners employ separate spring elements for biasing a toggle element into a toggle locking position once inside a wall cavity after insertion of the element. Other toggle bolt fasteners employ a cam surface engageable with a threaded end of a screw-fastening bolt that is operable to move the toggle into a locking position. In all cases, however, fasteners currently available, including the toggle bolt fasteners, are not removable, since once the toggle element is rotated, the toggle element is not readily rotated for removal without enlarging or otherwise damaging the hole in the wall.

BRIEF DESCRIPTION OF THE DRAWINGS

The present invention is illustrated by way of example and not limitation in the accompanying figures, in which like reference numerals indicate similar elements, and in which.

DETAILED DESCRIPTION OF THE PREFERRED EMBODIMENTS

An anchor facilitates blind engagement by a first fastener in order to connect an object to a hollow substrate. The first fastener may be a bolt, a screw, or any suitable fastener, such as a threaded fastener. The anchor may be inserted into a cavity accessible through a hole defined in the hollow substrate to connect the object to the hollow substrate. The anchor includes a base plate to hold a second fastener such as a nut and a pair of laterally offset arms extending from the base plate, such that each arm includes an engagement structure disposed at a distal end of each arm. The engagement structure includes a collar extending outwardly from each arm for engaging an outer surface, and optionally, an inner surface of the hollow substrate upon insertion of the anchor into the cavity. The engagement structure of each arm cooperatively supports the anchor and complementarily engages the first fastener. Additionally, the engagement structure includes a tang extending inwardly from each arm generally defining a portion of a first aperture for engaging the first fastener.

Among other advantages, the anchor assembly may be easily inserted into a hole of the hollow substrate to position a nut in such a manner that the first fastener may be engaged therewith. Additionally, the anchor assembly holds the second fastener from turning while the first fastener is being tightened. Furthermore, the anchor assembly may be completely removed from the hole in the event the anchor assembly becomes damaged. For example, in the event the second fastener has threads that become stripped, the bolt may be completely removed, thus allowing removal of the anchor and replacement with another anchor as desired. Accordingly, the anchor may be removed in the reverse manner in which the anchor was installed or was inserted into hole. Additionally, the anchor assembly may be employed in a manufacturing environment, such as during automobile assembly to increase the productivity and efficiency for the attachment of objects to an automobile body structure and frame.

Figure 1A:
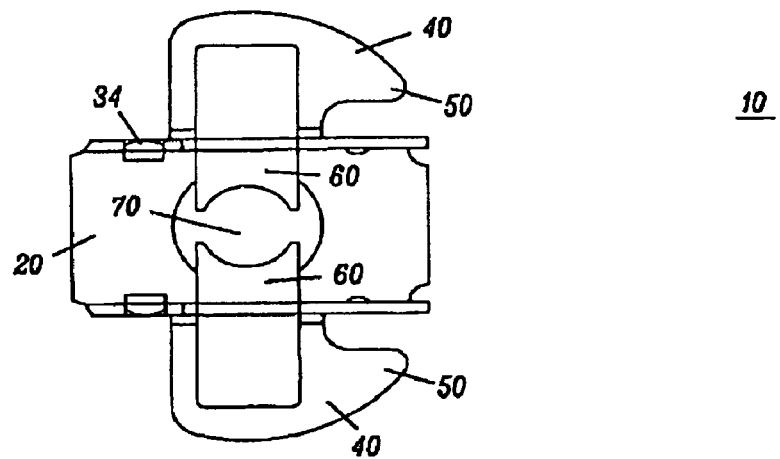
FIG. 1A is a top view of an anchor in accordance with an exemplary embodiment of the present invention.

FIG. 1A is a top view of the anchor 10 according to one embodiment of the invention. The anchor 10 includes a base plate 20 and at least one arm 30 (FIGS. 1B and 1C) as discussed below, such as a pair of laterally offset arms 30 extending from the base plate 20, such that each arm 30 includes an engagement structure 40 disposed at a distal end of the arm 30. The engagement structure 40 of each arm 30 cooperatively supports the anchor 10 and complementarily engages a fastener 72 (FIGS. 2 through 5) such as a bolt, screw or other suitable fastener as discussed further below. It should be understood that implementation of other variations and modifications of the anchor 10 and its various aspects shown in the figures and described herein will be apparent to those having ordinary skill in the art and that the invention is not limited by the specific embodiments described. For example, one arm 30 and a corresponding engagement structure 40 may be employed. Alternatively, three, four or more arms 30 may be employed. Further, the shape of the arm 30 and the engagement structure 40 may be different from that shown in FIG. 1A.

Figure 1B:
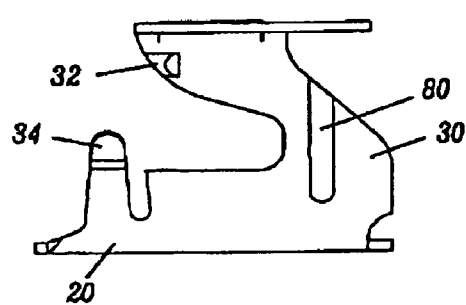
FIG. 1B is a side view of the anchor of FIG. 1A according to one embodiment of the present invention.
Figure 3:
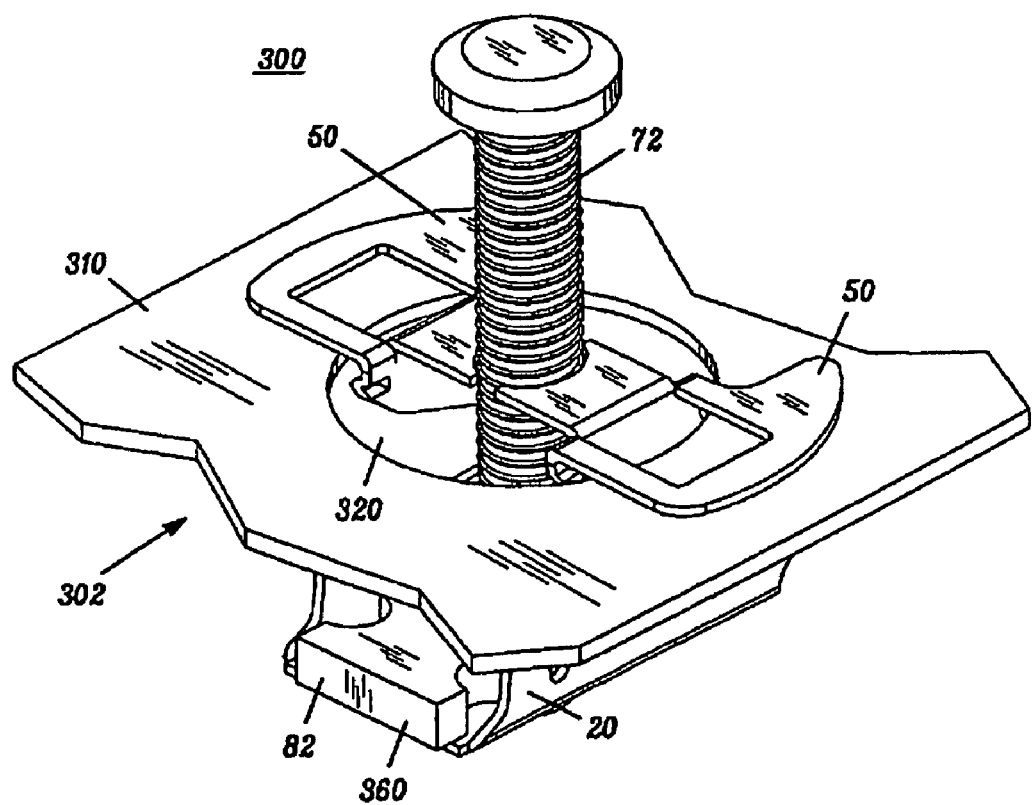
FIG. 3 is a perspective view of an anchor assembly in a first operative position according to one embodiment of the present invention.
Figure 4:
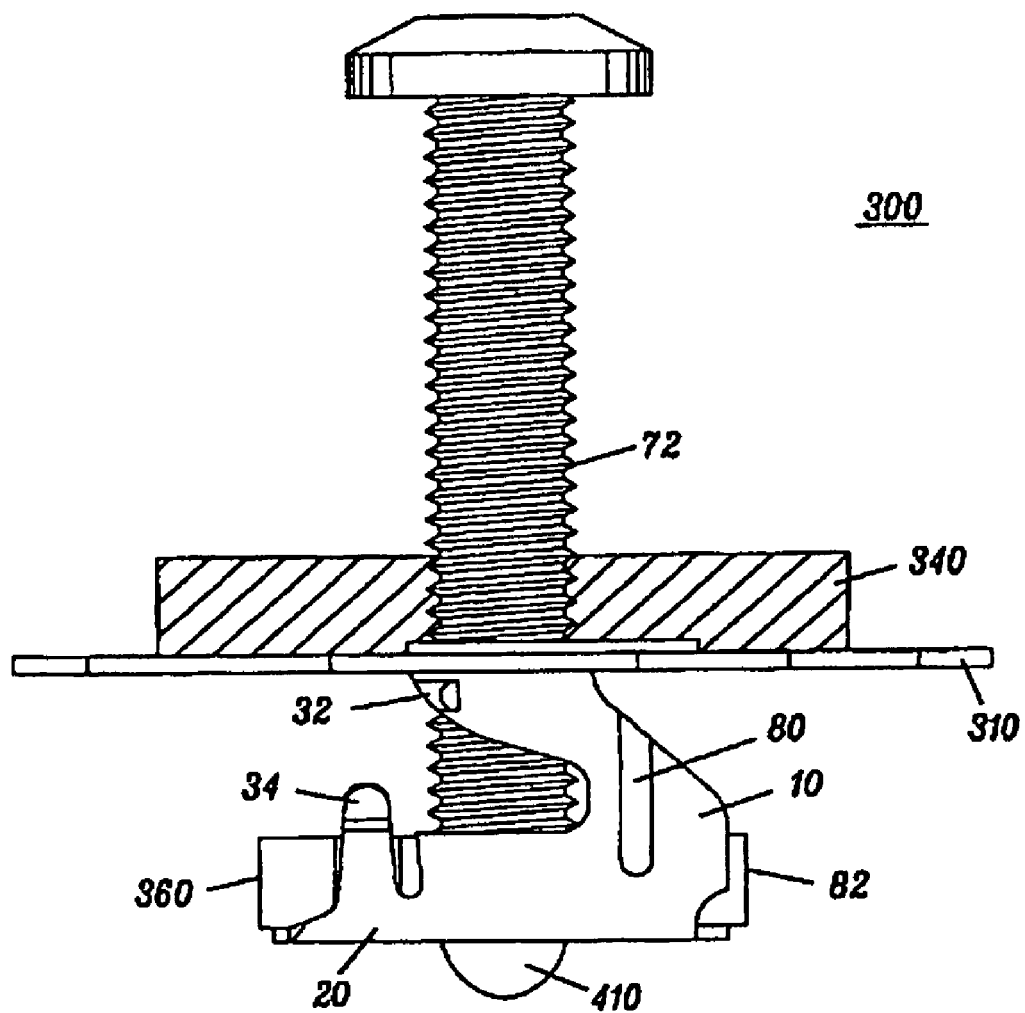
FIG. 4 is a side view of the anchor assembly of FIG. 3 according to one embodiment of the invention.

FIG. 1B is a side view of the anchor 10 shown in FIG. 1A, and illustrates a side view of one arm 30. The at least one arm 30 further includes a protrusion 32 formed adjacent the engagement structure 40 (FIGS. 1A and 1C), such that a notch is defined between the protrusion 32 and the engagement structure 40 that engages the hole 320 (shown in FIG. 3) to impede movement of the anchor 10 while the first fastener 72 is rotated. Additionally, as the first fastener 72 is inserted into the tangs 60, (FIGS. 1A, 1C and 2) the protrusion 32 engages the hole 320 (FIGS. 2 through 5), such that the anchor 10 is positively held and therefore holds the second fastener 82 from turning with the first fastener 72 when the latter is tightened. According to one embodiment of the invention, the notch may form a pocket receptacle such that at least one protrusion 32 expands to frictionally engage the hole 320 or at least one portion of the hole 320 when the first fastener 72 is inserted into the tangs 60. For example, each arm 30 includes a protrusion 32 to form a pocket receptacle to engage the hole 320 in a hollow substrate 300 (FIG. 3). The protrusion 32 may therefore also hold the anchor 10 in the hole 320 to prevent the anchor 10 from falling out of the hole 320 once inserted or while the anchor 10 is being attached to the object 340 (FIGS. 3 and 4). The base plate 20 includes a resilient prong 34 to secure a second fastener in the base plate 20, as described in more detail below.

Figure 1C:
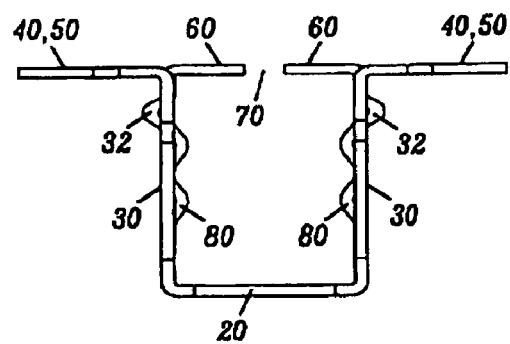
FIG. 1C is a front view of the anchor of FIG. 1A and FIG. 1B according to one embodiment of the invention.

FIG. 1C is a front view of the anchor 10 of FIG. 1A. The engagement structure 40 includes a collar 50 extending outwardly from each arm 30. The engagement structure 40 also includes a tang 60 extending inwardly from each arm 30, generally defining a portion of a first aperture 70. Each arm 30 may be formed by a parallel fold line formed with the base plate 20. According to one embodiment, the anchor 10 is formed from a continuous solid structure, such as a sheet of steel and then hardened by for example a heat treatment, as is known in the art.

The anchor 10 may be formed from a strip of steel metal on a progressive die. The steps employed to form the anchor 10 may include blanking to cut a desired shape in the strip of steel metal while maintaining a carrying tab to facilitate progressively moving the strip to the next die. Other steps may include the formation of shear tabs and punches to form holes and channels as is known in the art.

Figure 2:
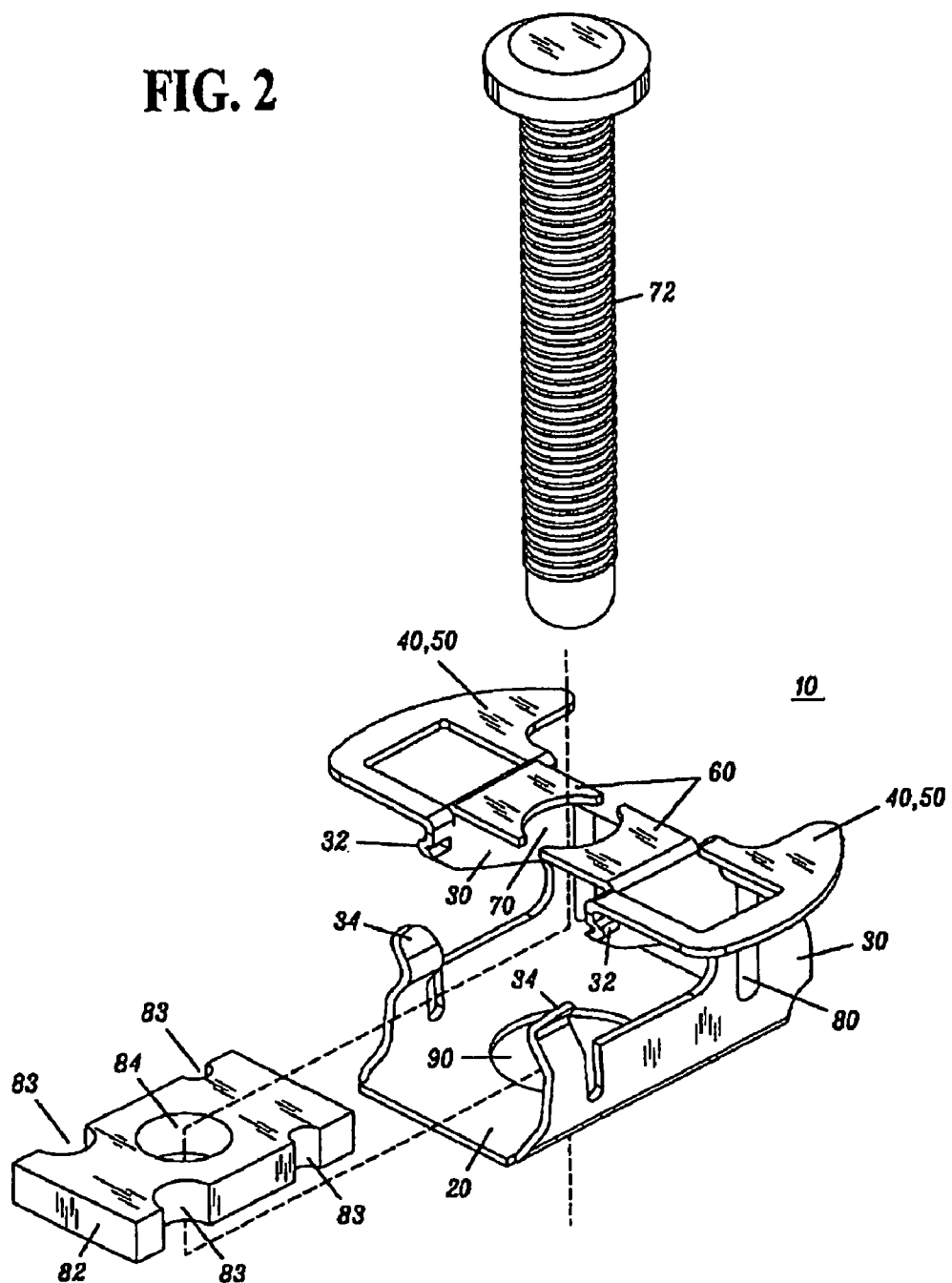
FIG. 2 is a perspective view of an anchor of FIG. 1A according to one embodiment of the invention.

FIG. 2 is a perspective view of the anchor 10 shown in FIGS. 1A through 1C. The engagement structure 40 of each arm 30 cooperatively supports the anchor 10 and complementarily engages a first fastener 72. Arm 30 further includes an indexing element 80 to guide the second fastener 82 for proper movement within the anchor 10, as described in more detail below. The second fastener 82 includes at least one indexing structure 83 for engagement with the indexing element 80 to facilitate movement within the anchor 10 as discussed in more detail below. The second fastener 82 has a second aperture 84, such as a threaded aperture to engage the first fastener 72. The tang 60 extends inwardly from each arm 30, generally defining the portion of the first aperture 70. According to one embodiment, rubber, plastic, paint or any suitable coating or covering may be applied to the anchor 10 in order to reduce buzzing, squeaking and rattling (BSR) during operation of the vehicle. According to one embodiment, base plate 20 may have a base plate aperture 90 to allow the first fastener 72 to pass through.

Figure 5:
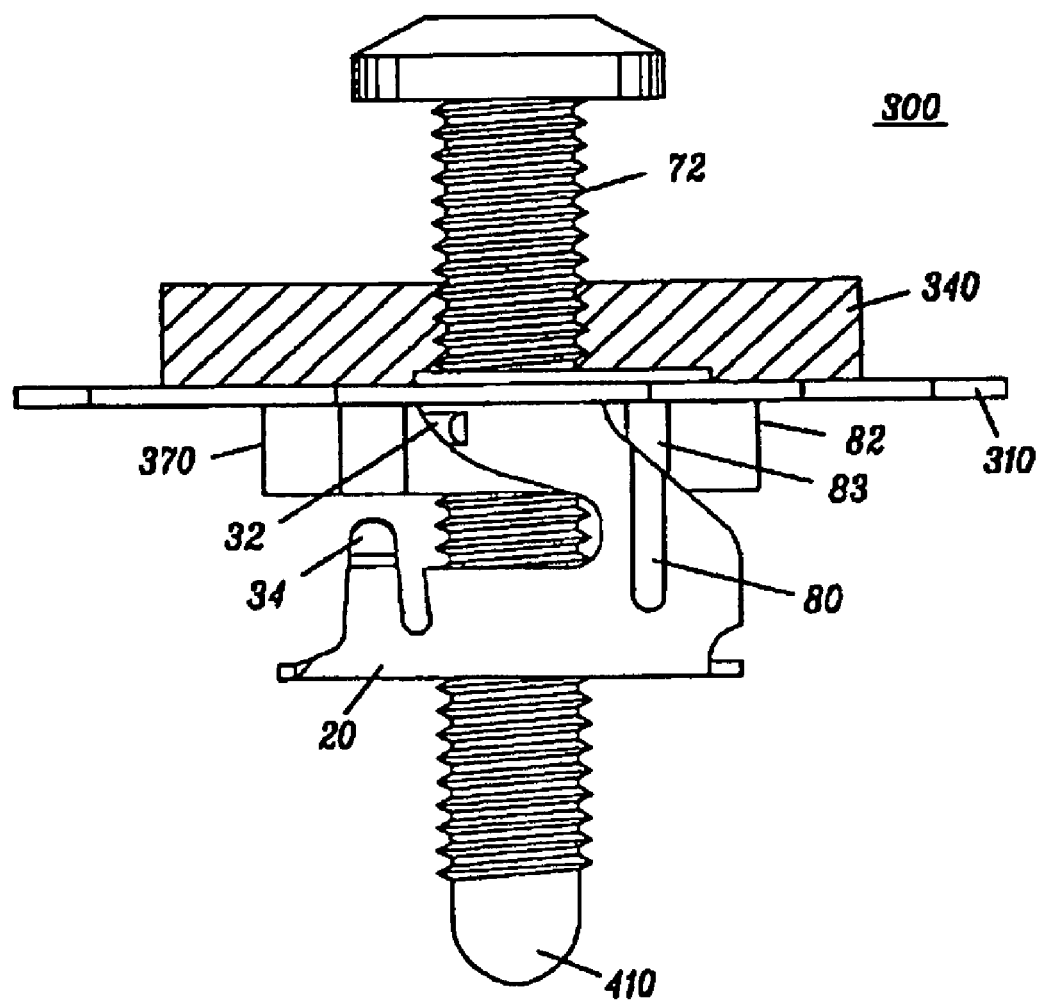
FIG. 5 is a side view of the anchor assembly of FIG. 3 in a second operative position according to another embodiment of the present invention.
Figure 6:
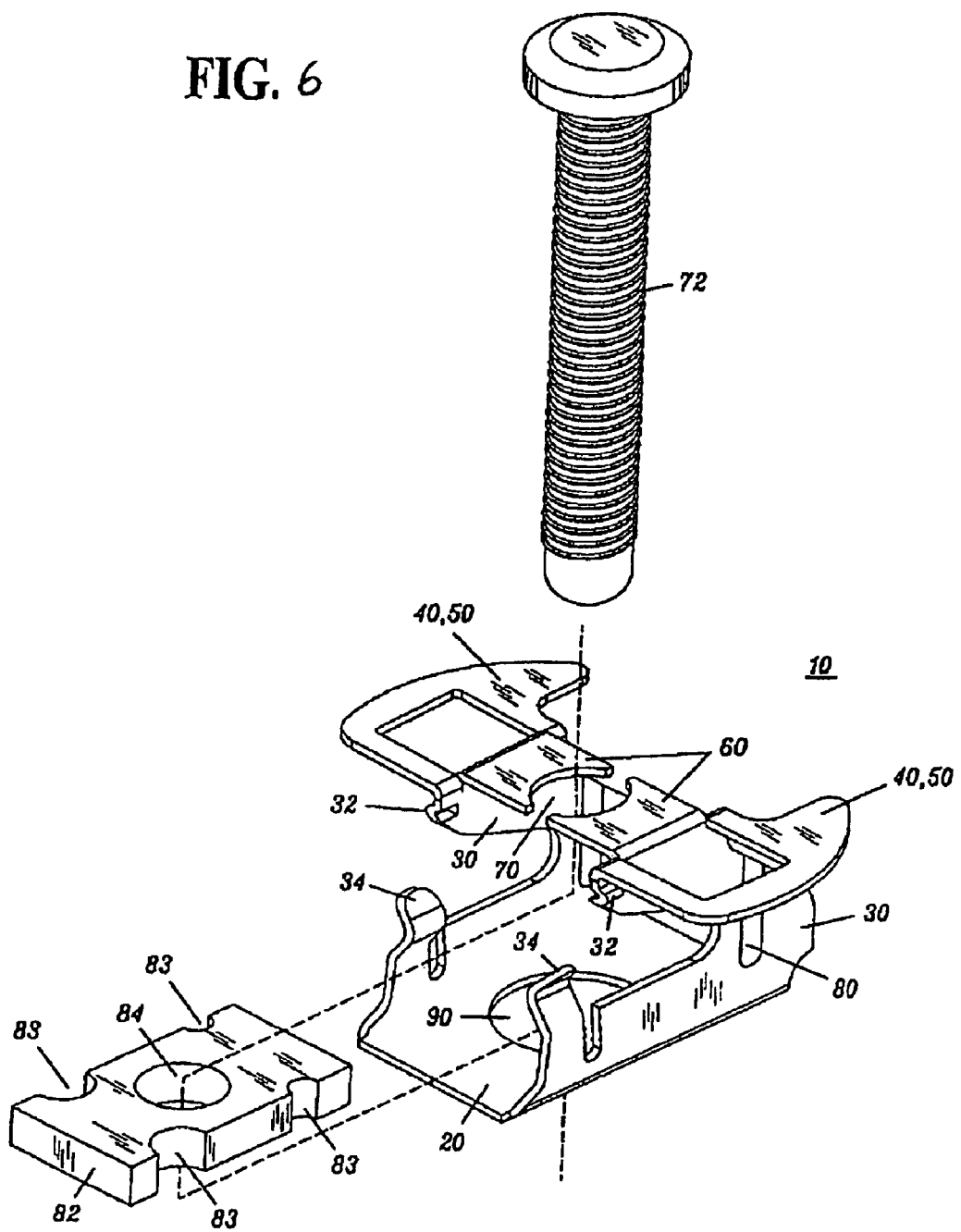
FIG. 6 is a perspective view of an anchor according to one embodiment of the invention.

FIG. 3 is a perspective view of an anchor assembly 300, including the anchor 10 for insertion into the cavity 302 accessible through the hole 320 defined in a hollow substrate 310 to facilitate blind engagement of the first fastener 22, in order to connect the 340 object 340 as discussed below and as shown in FIGS. 4 and 5, to the hollow substrate 310. According to one embodiment, the first fastener 72 is a bolt, a screw, a rivet, or any other suitable fastener. For example, the first fastener 72 is threaded to engage the second fastener 82. The hollow substrate 310 may be a plate, a panel, a wall, or any structure for which the anchor 10 is inserted to facilitate blind engagement of the first fastener 72. According to one embodiment, the hollow substrate 310 is a part of a vehicle body or a chassis, or any suitable portion of a vehicle. The tang 60 (FIGS. 1A, 1C and 3) extends inwardly from each arm 30, generally defining the portion of the first aperture 70 for engaging the first fastener 72. For example, each inwardly extending tang 60 receives the first fastener 72 such as a threaded screw fastener, such that the tangs 60 expand when frictionally engaging the first fastener 72. According to one embodiment, the first fastener 72 has a tapered tip 410 (FIGS. 4 and 5) to facilitate engagement of the first fastener 72 with each tang 60 and to facilitate engagement of the first fastener 72 with the second aperture 84 (FIG. 2) on the second fastener 82. Accordingly, as the first fastener 72 is inserted into the tangs 60, the first fastener 72 expands the tangs 60 to make contact with four points along a rim of the hole 320. This contact ensures that the anchor 10 will not rotate, or will rotate very little when the first fastener 72 is being turned.

According to one embodiment, each tang 60 extending inwardly from each arm 30 is horizontally offset from each other to accommodate the pitch of the thread on the first fastener 72. For example, one tang 60 may be slightly higher than the other tang 60, so that the first fastener 72 engages the first aperture 70 along an axis of the first aperture 70. According to one embodiment, the first aperture 70 may be preferably concentrically aligned with the second aperture 84 of the second fastener 82. Alternatively, the first aperture 70 may be offset in alignment with the second aperture 84 to accommodate the skewed insertion of the first aperture 70, for example if the hollow substrate 310 is curved or is angled relative to anchor 10.

According to one embodiment, the base plate 20 may have a base plate aperture 90 (FIG. 2) to permit the first fastener 72 to pass through the base plate aperture 90 as the first fastener 72 is inserted into the anchor 10. For example, as the first fastener 72 is rotated to engage the second aperture 84 of the second fastener 82, the first fastener 72 may pass through the base plate aperture 90 of the base plate 20. According to an alternative embodiment, the length of the first fastener 72 is such that the first fastener 72 does not extend beyond the base plate 20 when, for example, the first fastener 72 is fully inserted and the second fastener 82 is in a second operative position 370 (FIG. 5I. Accordingly, the base plate 20 would not have the base plate aperture 90, since none is required.

The anchor assembly 300 further includes the second fastener 82, such as a nut, that moves from a first operative position 360 to the second operative position 370 as mentioned above and described further below. As previously stated, the second fastener 82 includes the second aperture 84 (FIG. 2I vertically and concentrically aligned with the first aperture 70. The second aperture 84 may include a threaded hole for complementary engagement with the first fastener 72. Alternatively, the second aperture 84 may include prongs, ribs, teeth or any other suitable structure for complementary engagement with the first fastener 330.

According to one embodiment, each of the pair of laterally offset arms 30 are disposed relative to the base plate 20 at an angle preferably less than 90 degrees, such that the base plate 20 may be readily inserted through the hole 320 and into the cavity 302. Accordingly, the arms 30 and the base plate 20 form a pocket to permit the base plate 20 to slide into hole 320. For example, the anchor 10 may be tilted, such that a vertical axis of the anchor 10 and an axis of the hole 320 are not parallel. Accordingly, the anchor 10 is inserted into the hole 320 by tilting the anchor 10, such that the pocket formed by the arms 30 disposed relative to the base plate 20 accommodates at least a portion of a rim around the hole 320. According to one embodiment, the base plate 20 is inserted into the hole 320 and the collar 50 supports the anchor 10 on an outside portion of the hollow substrate 310 as shown in FIG. 3 after the base plate 20 is completely inserted into the hole 320 and the anchor 10 is axially aligned with the hole 320. Alternatively, the anchor 10 may be formed such that any pocket angle and any angle of tilt may be employed, including 0°, 30°, 45°, 60°, 89°, 145°, and so on. According to another embodiment, the anchor 10 may also employ a toggle mechanism to facilitate insertion of at least a portion of the anchor 10 into the hole 320.

The second fastener 82 engages the base plate 20 when disposed in the first operative position 360 and engages the hollow substrate 310 when disposed in the second operative position 370 (FIG. 5). For example, as the first fastener 72 is rotated to engage the second fastener 82, the second fastener 82 moves toward the hollow substrate 310 until the second fastener 82 engages the hollow substrate 310. At this point, the second fastener 82 provides a rigid connection from which the first fastener 72 may attach the desired object 340 (FIGS. 4 and 5I to be attached to the hollow substrate 310. For example, the object 340 may be a bracket such as an automobile component, a trimpiece, a body panel, a roof rack or any suitable object to be attached to the hollow substrate 310, such as an automobile chassis, a body panel, or a bracket attached to the automobile chassis. Accordingly, one killed in the art would readily find use of the anchor 10 in other applications such as aircraft, spacecraft, boating and furniture, as well as in home and building construction. 340 may be a bracket such as an automobile component, a trimpiece, a body panel, a roof rack or any suitable object to be attached to the hollow substrate 310, such as an automobile chassis, a body panel, or a bracket attached to the automobile chassis. Accordingly, one skilled in the art would readily find use of the anchor 10 in other applications such as aircraft, space craft, boating, furniture, as well as in home and building construction.

FIG. 4 is a side view of the anchor assembly 300 as shown in FIG. 3. According to one embodiment, the base plate 20 has a width less than a diameter of the hole 320 (FIG. 3), and the second fastener 82 has a length greater than the diameter of the hole 320. For example, the second fastener 82 may have a generally rectangular shape, such that the width of the second fastener 82 is less than the diameter of the hole 320 to permit insertion of the anchor 10 into the hollow substrate 310 having the hole 320. The length of the second fastener 82 may be greater than the diameter of the hole 320, such that the rectangular shaped second fastener 82 is operable to engage the hollow substrate 310. The hole 320 may have any shape, such as a circle, a square, a rectangle, a pentagon, a hexagon, a polygon, an n-sided polygon where n is a whole number, an ellipse, and/or an oval, or any suitable shape.

FIG. 5 illustrates a side view of the anchor assembly 300 and the second fastener 82 in a second operative position 370. According to one embodiment of the invention, at least one of the arms 30 includes the indexing element 80 to engage the indexing portion 83 defined on the second fastener 82 and the resilient prong 34 in order to orient the second fastener 82 during movement from the first operative position 360 (FIGS. 4 and 5) to the second operative position 370. According to one embodiment of the invention, the indexing element 80 on the arm 30 is a groove and the indexing portion 83 on the second fastener 82 is a prong, in order to allow the indexing element 80 on the arm 30 to guide the second fastener 82 from the first operative position 360 to the second operative position 370. Alternatively, any suitable complementary indexing element 80, resilient prong 34 and indexing portion 83 may be employed. The base plate 20 further includes at least one resilient prong 34 to retain the second fastener 82 in the first operative position 360 prior to engagement with the first fastener 72. As shown in FIGS. 2, 4 and 5, according to one embodiment of the invention, the second fastener 82 includes a pair of indexing structures on each side of the second fastener 82 in order to engage on each side the indexing element and the resilient prong 34.

Among other advantages, the anchor 10 may be easily inserted into a hole 320 to position a second fastener 82 in such a manner that a first fastener 72 may be engaged therewith. Additionally, the anchor assembly 300 holds the second fastener 82 from turning while the first fastener 72 is being tightened. Furthermore, the anchor assembly 300 may be completely removed from the hole 320 in the event the anchor assembly 300 becomes damaged. For example, in the event the second fastener 82 has threads that become stripped, the first fastener 72 may be completely removed, thus allowing removal of the anchor 10 and replacement with another anchor 10 as desired. Accordingly, the anchor 10 may be removed in the reverse manner in which the anchor 10 was installed or was inserted into hole 320. Additionally, the anchor assembly 300 may be employed in a manufacturing environment, such as in automobile assembly to increase the productivity and efficiency for the attachment of objects to an automobile body structure and frame.

It should be understood that implementation of other variations and modifications of the invention and its various aspects will be apparent to those with ordinary skill in the art, and that the invention is not limited by this specific embodiment described. It is therefore contemplated to cover the present invention and any and all modifications, variations or equivalents that fall within the spirit and scope of the basic underlying principles disclosed and claimed herein.

What is claimed is:

1. An anchor for insertion into a cavity accessible through a hole defined in a hollow substrate to facilitate blind engagement between a first fastener and a second fastener, in order to connect an object to the hollow substrate, comprising:

a base plate and a pair of laterally offset arms extending from the base plate, such that each arm includes an engagement structure disposed at a distal end of each arm, wherein the engagement structure of each arm cooperatively supports the anchor and complementarily engages the first fastener, wherein each arm comprises a protrusion formed adjacent the engagement structure, such that a notch is defined between the protrusion and the engagement structure which engages the hole to impede movement of the anchor, the engagement structure including:
  a collar extending outwardly from each arm for engaging the hollow substrate upon insertion of the anchor into the cavity; and
  a tang extending inwardly from each arm, generally defining a portion of a first aperture for engaging the first fastener, wherein at least one of the arms includes an indexing element to engage an indexing portion, defined on the second fastener, in order to orient the second fastener during movement from a first operative position to a second operative position.

2. The anchor of claim 1 wherein the second fastener includes a second aperture generally vertically concentrically aligned with the first aperture.

3. The anchor of claim 1 wherein the second fastener engages the base plate when disposed in the first operative position and engages the hollow substrate when disposed in the second operative position.

4. The anchor of claim 1 wherein the base plate further includes at least one resilient prong to retain the second fastener in the first operative position prior to engagement with the first fastener.

5. The anchor of claim 1 wherein the base plate has a width less than a diameter of the hole and the second fastener has a length greater than the diameter of the hole.

6. The anchor of claim 1 wherein the first fastener has a tapered tip to facilitate engagement of the first fastener with each tang, and to facilitate engagement of the first fastener with the second aperture on the second fastener.

7. The anchor of claim 1 wherein the laterally offset arms are disposed relative to the base plate at an angle less than 90 degrees such that the base plate may be inserted through the hole and into the cavity.

8. An anchor for insertion into a cavity accessible through a hole defined in one hollow substrate to facilitate blind engagement between a first fastener and a second fastener, in order to connect an object to the one hollow substrate comprising:

a base plate including a base plate aperture defined therein and a pair of laterally offset arms extending from the base plate, each arm including an engagement structure disposed at a distal end of each arm, wherein the engagement structure of each arm cooperatively supports the anchor and complementarily engages the first fastener;

wherein each arm comprises a protrusion formed adjacent the engagement structure, such that a notch is defined between the protrusion and the engagement structure which engages the hole to impede movement of the anchor, the engagement structure including:
  a collar extending outwardly from each arm for engaging the hollow substrate upon insertion of the anchor into the cavity; and
  a tang extending inwardly from each arm generally defining a portion of a first aperture for engaging the first fastener, wherein the first aperture and the base plate aperture are generally vertically concentrically aligned, wherein at least one of the arms includes an indexing element to engage an indexing portion defined on the second fastener in order to orient the second fastener during movement from a first operative position to a second operative position.

9. The anchor of claim 8 wherein the second fastener includes a second aperture generally vertically concentrically aligned with the first aperture and the base plate aperture.

10. The anchor of claim 8 wherein the second fastener engages the base plate when disposed in the first operative position, and engages the hollow substrate when disposed in the second operative position.

11. The anchor of claim 8 wherein the base plate further includes at least one resilient prong for retaining the second fastener in the first operative position prior to engagement with the first fastener.

12. The anchor of claim 8 wherein the base plate has a width less than a diameter of the hole and the second fastener has a length greater than the diameter of the hole.

13. The anchor of claim 8 wherein the first fastener has a tapered tip to facilitate engagement of the first fastener with each tang, and to facilitate engagement of the first fastener with the second aperture on the second fastener.

14. The anchor of claim 8 wherein the laterally offset arms are disposed relative to the base plate at an angle less than 90 degrees such that the base plate may be inserted through the hole and into the cavity.

15. The anchor of claim 8 wherein the anchor is removable from the hollow substrate.

16. The anchor of claim 8 wherein the anchor is removable from the hollow substrate such that the second fastener moves from the second operative position to the first operative position.

17. The anchor of claim 8 wherein the anchor is included in at least one of a vehicle, an automobile, a truck, an airplane, a ship, a boat, furniture, building construction and spacecraft.

18. A vehicle comprising an anchor for insertion into a cavity accessible through a hole defined in a hollow substrate to facilitate blind engagement between a first fastener and a second fastener in order to connect an object to the hollow substrate, comprising:

a base plate and a pair of laterally offset arms extending from the base plate, such that each arm includes an engagement structure disposed at a distal end of each arm, wherein the engagement structure of each arm cooperatively supports the anchor and complementarily engages the first fastener, wherein each arm comprises a protrusion formed adjacent the engagement structure, such that a notch is defined between the protrusion and the engagement structure which engages the hole to impede movement of the anchor, the engagement structure including:
  a collar extending outwardly from each arm for engaging the hollow substrate upon insertion of the anchor into the cavity; and
  a tang extending inwardly from each arm generally defining a portion of a first aperture for engaging the first fastener, wherein at least one of the arms includes an indexing element to engage an indexing portion defined on the second fastener in order to orient the second fastener during movement from a first operative position to a second operative position.

19. The vehicle of claim 18 wherein the second fastener includes a second aperture generally vertically concentrically aligned with the first aperture.

20. The vehicle of claim 18 wherein the second fastener engages the base plate when disposed in the first operative position and engages the hollow substrate when disposed in the second operative position.

21. The vehicle of claim 18 wherein the base plate further includes at least one resilient prong to retain the second fastener in the first operative position prior to engagement with the first fastener.

22. The vehicle of claim 18 wherein the base plate has a width less than a diameter of the hole and the second fastener has a length greater than the diameter of the hole.

23. The vehicle of claim 18 wherein the first fastener has a tapered tip to facilitate engagement of the first fastener with each tang, and to facilitate engagement of the first fastener with the second aperture on the second fastener.

24. The vehicle of claim 18 wherein the laterally offset arms are disposed relative to the base plate at an angle less than 90 degrees such that the base plate may be inserted through the hole and into the cavity.

25. An anchor for insertion into a cavity accessible through a hole defined in a hollow substrate to facilitate blind engagement between a first fastener and a second fastener, comprising:

wherein at least one of the arms includes an indexing element to engage an indexing portion defined on the second fastener, the engagement structure including:

a tang extending inwardly from each arm, generally defining a portion of a first aperture for engaging the first fastener.

26. The anchor of claim 25 wherein the fastener is operable to move from a first operative position to a second operative position.

* * * * *